(12) United States Patent
Matthews

(10) Patent No.: US 11,772,847 B2
(45) Date of Patent: Oct. 3, 2023

(54) STORAGE CONTAINER WITH INTERNAL RELEASE MECHANISM

(71) Applicant: Darby Jo Matthews, Metairie, LA (US)

(72) Inventor: Darby Jo Matthews, Metairie, LA (US)

(\*) Notice: Subject to any disclaimer, the term of this patent is extended or adjusted under 35 U.S.C. 154(b) by 0 days.

(21) Appl. No.: 17/762,402

(22) PCT Filed: Aug. 20, 2021

(86) PCT No.: PCT/US2021/046820
§ 371 (c)(1),
(2) Date: Mar. 22, 2022

(87) PCT Pub. No.: WO2022/040494
PCT Pub. Date: Feb. 24, 2022

(65) Prior Publication Data
US 2022/0340333 A1     Oct. 27, 2022

Related U.S. Application Data

(60) Provisional application No. 63/068,468, filed on Aug. 21, 2020.

(51) Int. Cl.
*B65D 25/02*     (2006.01)
*B65D 43/02*     (2006.01)

(52) U.S. Cl.
CPC ......... *B65D 25/02* (2013.01); *B65D 43/0204* (2013.01); *B65D 2543/00092* (2013.01)

(58) Field of Classification Search
CPC ........ A47G 19/18; B07B 1/20; B65D 77/245; B65D 83/0083
See application file for complete search history.

(56) References Cited

U.S. PATENT DOCUMENTS

| 2,188,249 | A | * | 1/1940 | Pringsauf | ........... | B65D 83/0083 |
| | | | | | | 222/548 |
| 2,334,595 | A | * | 11/1943 | Bailey | .................. | B65D 83/005 |
| | | | | | | 294/169 |
| 2,485,467 | A | * | 10/1949 | Weisbaum | ......... | B65D 83/0011 |
| | | | | | | 222/390 |
| 3,053,410 | A | * | 9/1962 | Eaddy | .................... | B65H 75/16 |
| | | | | | | 222/405 |

\* cited by examiner

*Primary Examiner* — Andrew T Kirsch
(74) *Attorney, Agent, or Firm* — Stephen M. Kepper; Intellectual Property Consulting, LLC

(57) ABSTRACT

The present invention includes a kit that includes a container with a removable lid that is operable to create a seal around the container, and an internal release mechanism that is operable to sever the bond between the food and the surrounding container so that food items can be easily removed from the container. The release mechanism comprises a bottom member and two opposing side members extending therefrom that are configured to conform to the contours of the container and is operable to dislodge food from the interior surface of the container in a sweeping fashion by rotating the release mechanism within the container. The release mechanism may be fastened to the bottom of the container and optionally may include a lip to aid in scraping food from the container.

11 Claims, 8 Drawing Sheets

US 11,772,847 B2

STORAGE CONTAINER WITH INTERNAL RELEASE MECHANISM

RELATED APPLICATIONS

This application claims priority to U.S. Provisional Application No. 63/068,468, filed Aug. 21, 2020. The entire contents of the above application are hereby incorporated by reference as though fully set forth herein.

FIELD

The present invention relates in general to storage containers and, in particular to a storage container for food items.

BACKGROUND

Storage containers, especially containers for food, are ubiquitous. They come in various shapes and sizes and employ various means for ensuring the top or lid is properly sealed to the container, including some form of snap-fitting or locking flaps. However, when the food or other items are ready to be removed, a person typically needs to locate and use a separate tool, such as a spoon, to remove the food, and often, these tools are not efficient in removing all the food from the container.

BRIEF SUMMARY OF THE INVENTION

It is an object of this invention to solve the existing challenges in the art by creating a storage container with an internal release mechanism that is operable to sever the food from the surrounding container. The present invention includes a kit that includes a container with a removable lid that is operable to create a seal around the container, and an internal release mechanism that is operable to sever the bond between the food and the surrounding container so that it can be cleanly removed from the container. The release mechanism comprises a bottom member and two opposing side members extending therefrom that are configured to conform to the contours of the container and is operable to dislodge food from the interior surface of the container in a sweeping fashion by rotating the release mechanism within the container. The release mechanism may be fastened to the bottom of the container and optionally may include a lip to aid in scraping food from the container.

DETAILED DESCRIPTION

Figure 1:
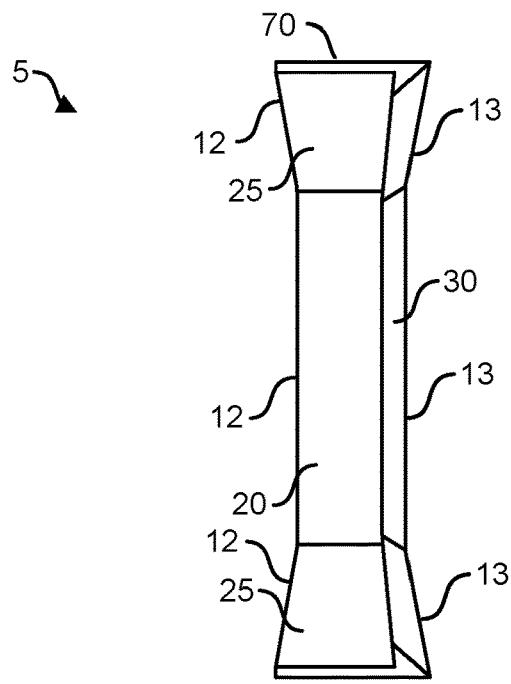
FIG. 1 is a profile view of an embodiment of the invention showing the release mechanism.
Figure 2:
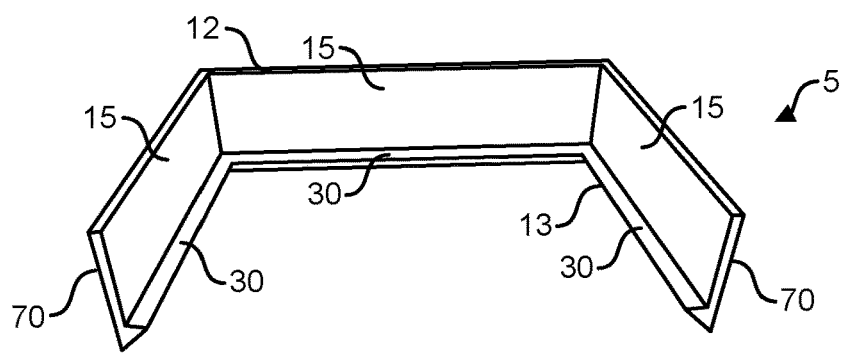
FIG. 2 is a top perspective view of an embodiment of the invention showing the release mechanism.
Figure 3:
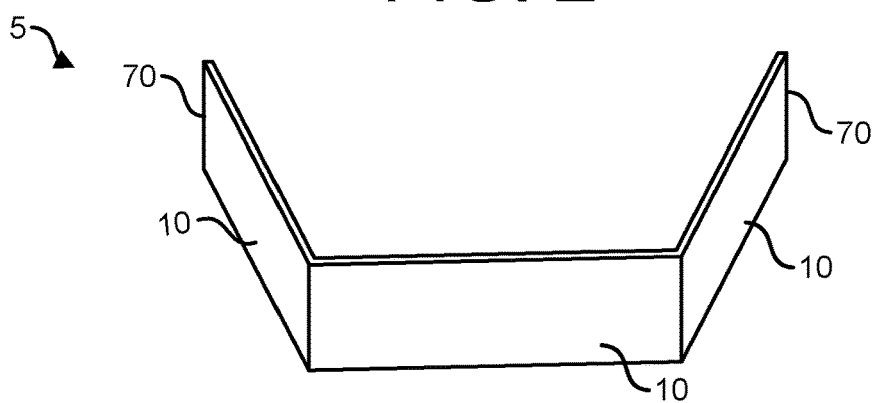
FIG. 3 is a bottom perspective view of an embodiment of the invention showing the release mechanism.
Figure 4:
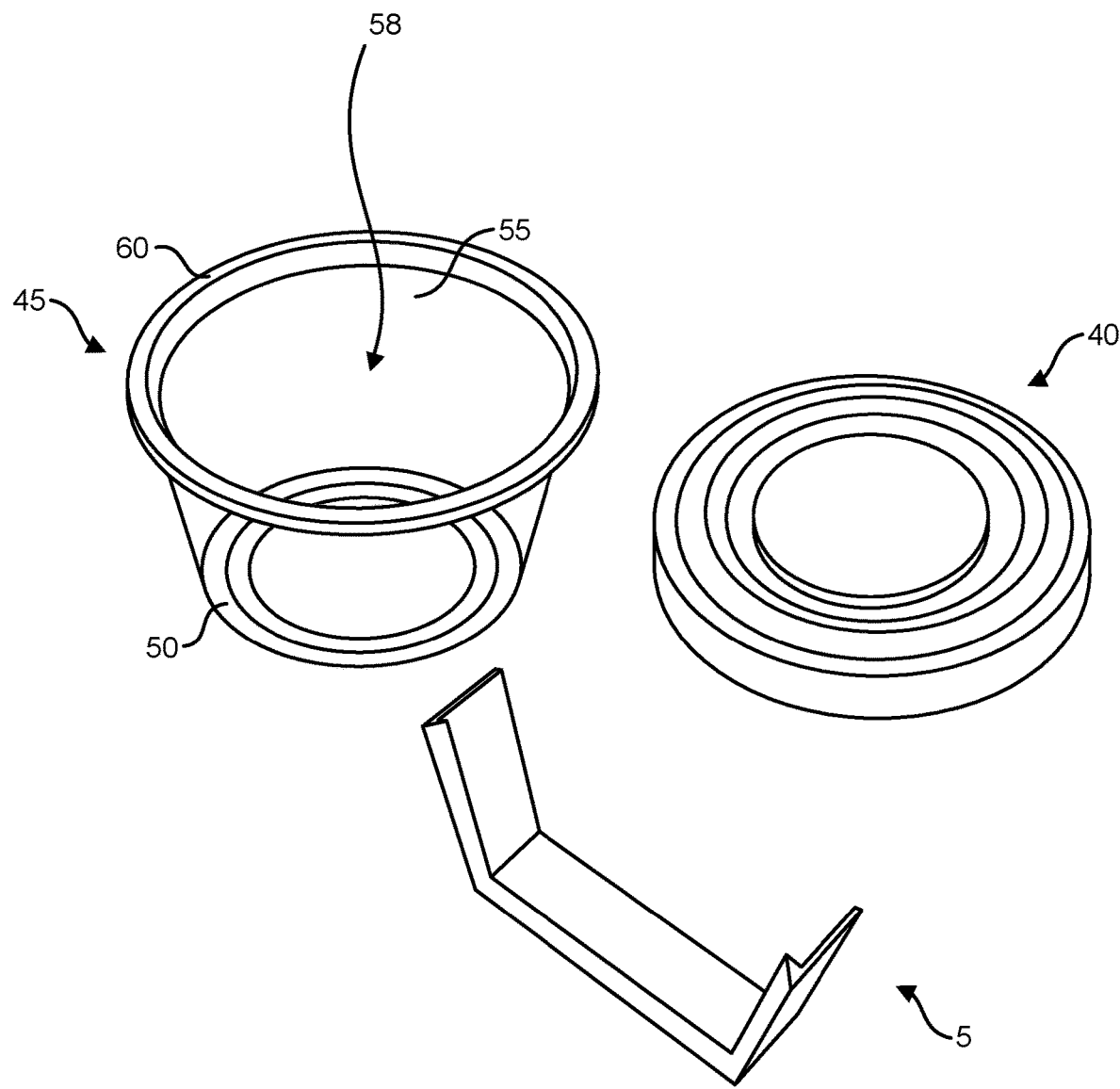
FIG. 4 is a top perspective view of a kit showing the container and release mechanism.
Figure 5:
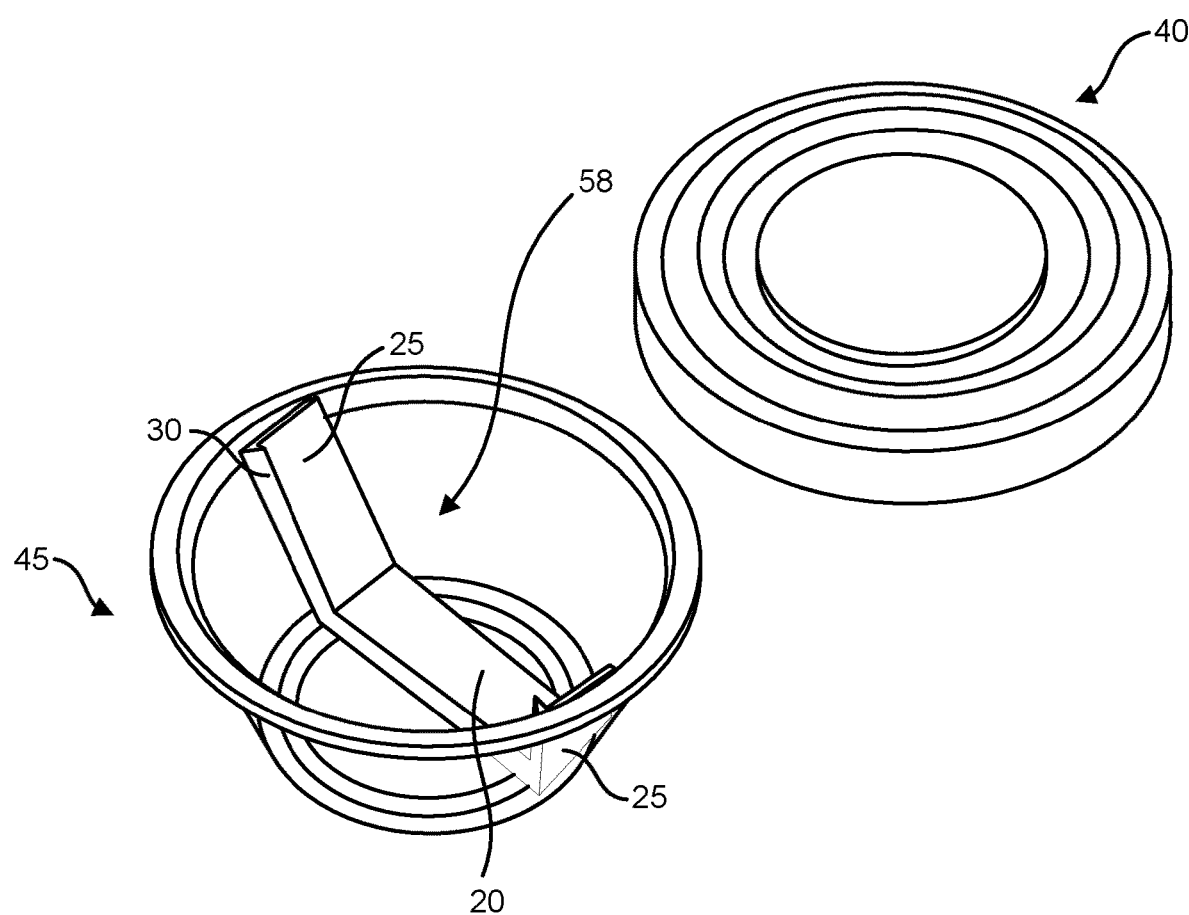
FIG. 5 is a top perspective view of a kit showing the container and release mechanism.
Figure 6:
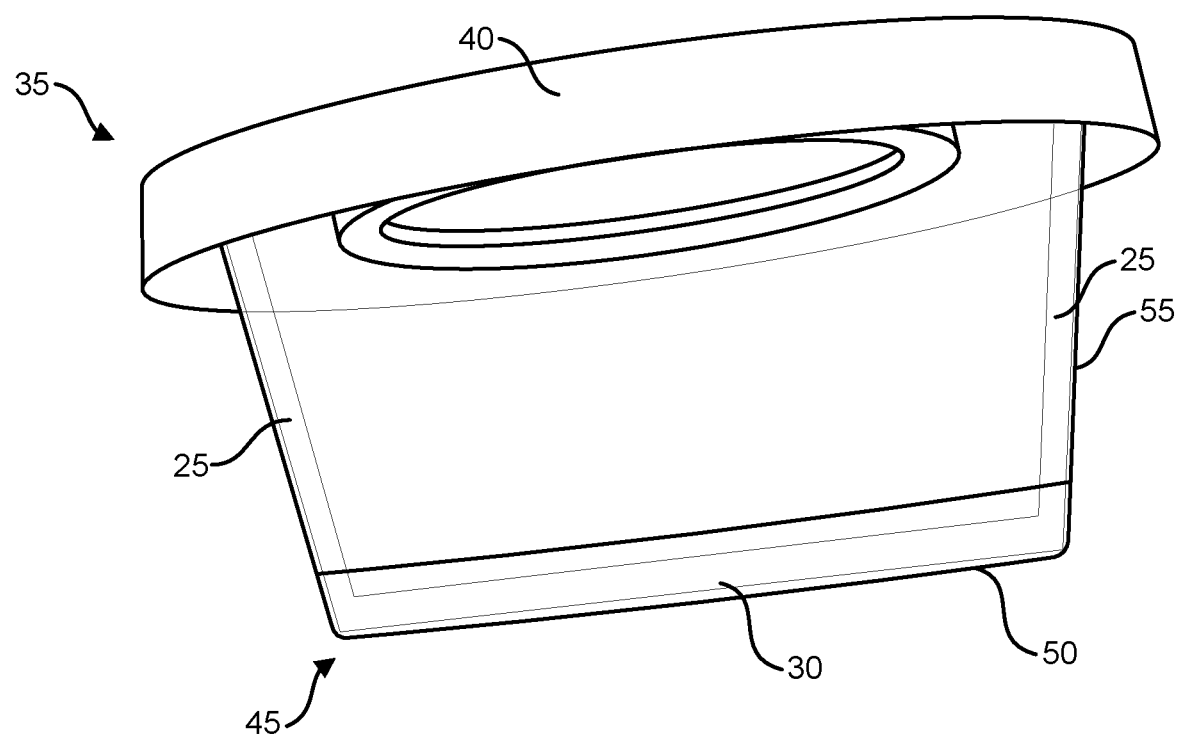
FIG. 6 is a side perspective view of a kit showing the release mechanism within the open container.
Figure 7:
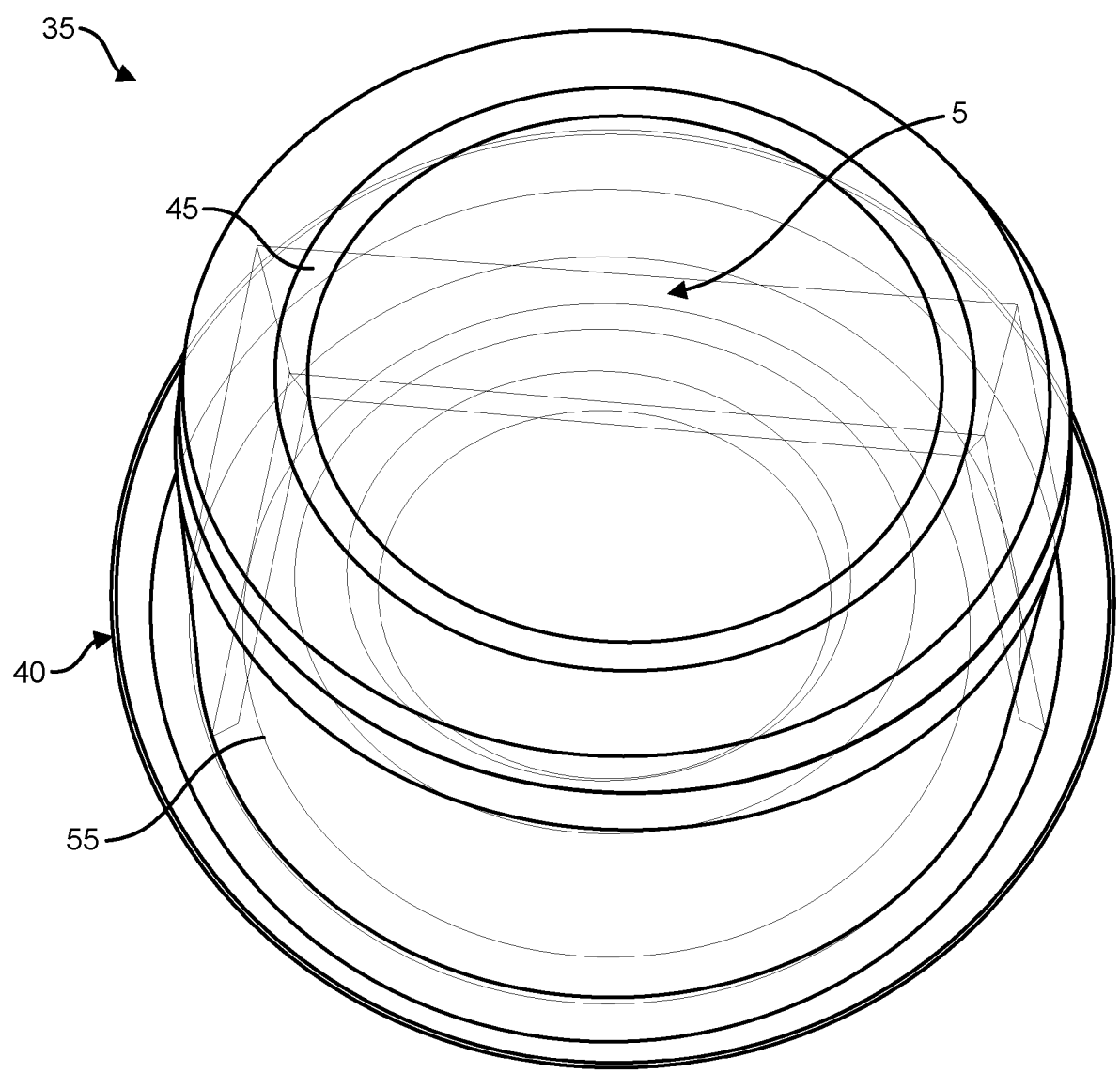
FIG. 7 is a bottom perspective view of a kit showing the release mechanism within the closed container.

Turning to FIGS. 1-3, a release mechanism 5 capable of dislodging food from a given container is shown. As shown in FIG. 1, the release mechanism 5 includes a bottom member 20, and two opposing side members 25 extending in a general upward direction therefrom. As shown in FIGS. 2-3, The bottom member 20 and opposing side members 25 each have an interior surface 15, an exterior surface 10, a first end 12, and a second end 13.

Although the embodiment of the release mechanism 5 shown in the figures depicts the side members 25 as straight members extending in general upward direction at an angle from the bottom member 20, it is anticipated that the shape of the release mechanism 5 may take various forms and shapes to allow the bottom member 20 and opposing side members 25 to conform to the contours of a given container 35 in a manner that allows the release mechanism 5 to be nested within the container 35. Exemplar embodiments of the release mechanism 5 may have side members 25 that are straight or curvilinear or a variation therebetween.

In an alternative embodiment, side members 25 and bottom member 20 may be coupled or hinged together as individual components to allow the side members 25 to move freely in relation to the bottom member 20. Alternatively, the side members 25 may be integrally connected to the bottom member 20 to form a single unitary body.

The release mechanism 5 is preferably made from semi-rigid polymers that are of sufficient strength to maintain their rigidity during the food removal process, but also flexible enough to conform to the contours of the container.

Turning to FIGS. 4-7, a kit that includes a storage container 35 and a release mechanism 5 as described above is shown. The container 35 includes a top 40 that is removably attached to a bottom portion 45. The bottom portion 45 includes a base 50 with a single annular wall 55 configured to create a storage space 58. Containers 35 of this nature are known in the art. For example, gelatin materials are often stored in transparent containers 35, like the one shown in the Figures, where the top end 60 of the annular wall 55 is sized and dimensioned to snap-fit into the top 40 to seal the container 35. For these containers 35, and as shown in the FIGS. 5-7, the preferred embodiment of the release mechanism 5 is operable to conform to the contours of such containers. In order to not interfere with the snap-fitting attachment, the distal ends 70 of the side members 25 are configured to not extend beyond the top end 60 of the container 35. Optionally, the distal ends 70 may be configured in other ways so as to not interfere with the seal of the container 35. For example, the distal ends 70 may be manually foldable between an "open" configuration and a "closed" configuration. Alternatively, the distal ends may be more flexible but resiliently biased in an open configuration, such that when the container is opened, the distal ends naturally extend into an "open" configuration that allows the user to grasp the ends 70.

In practice, a user would apply a force to the two distal ends 70 of the release mechanism 5 that would allow the release mechanism 5 to rotate along the interior surface of the container 35 in a sweeping fashion, and thus acting as a scraper that would dislodge the food in the container from the interior surface of the container 35.

In yet another embodiment, the release mechanism 5 includes a lip 30 that extends laterally from either of the ends 12, 13 of the bottom member 20 or side members 25. Preferably, and as shown in the Figures, this lip 30 would assist in scraping the food from the interior surface of the container 35.

Figure 8:
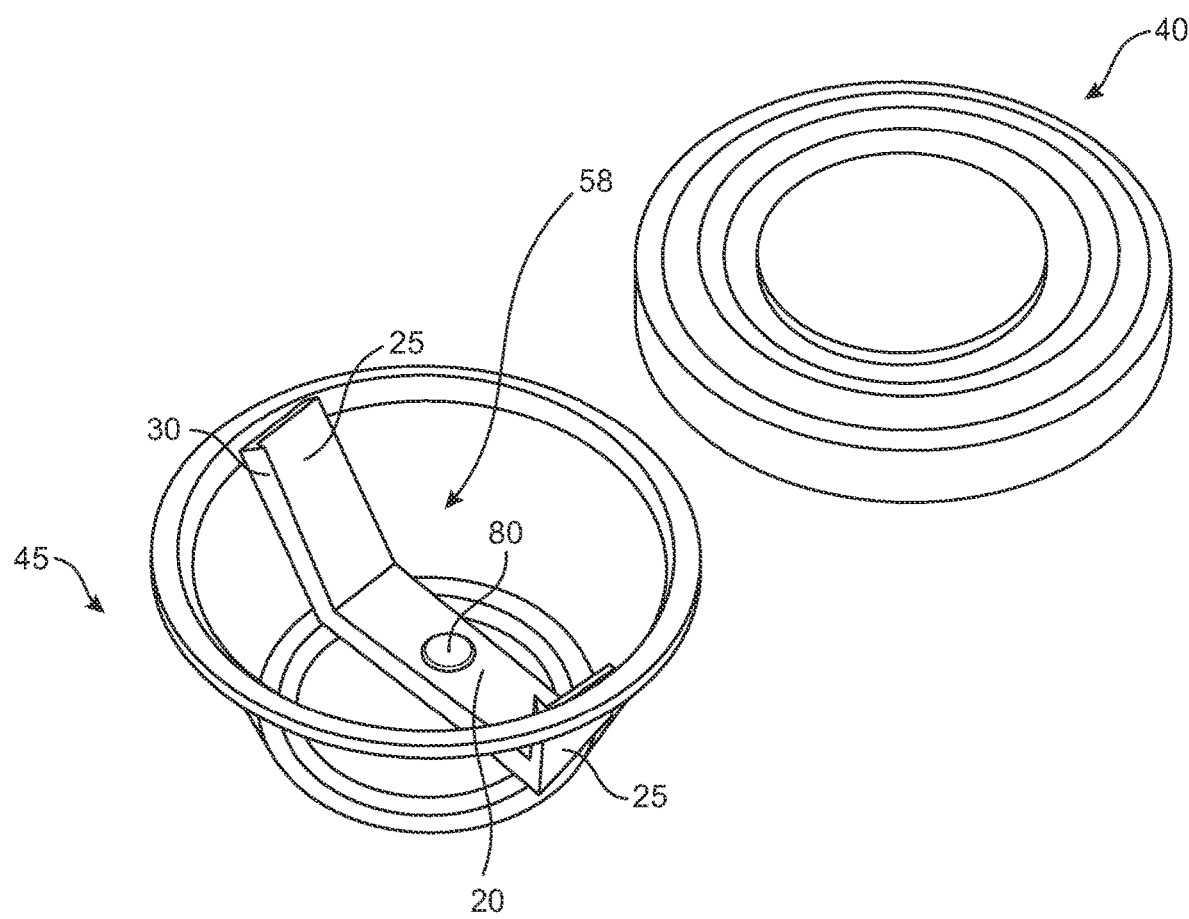
FIG. 8 is a top perspective view of a kit showing the release mechanism fastened to the bottom of the container with a fastener.
Figure 9:
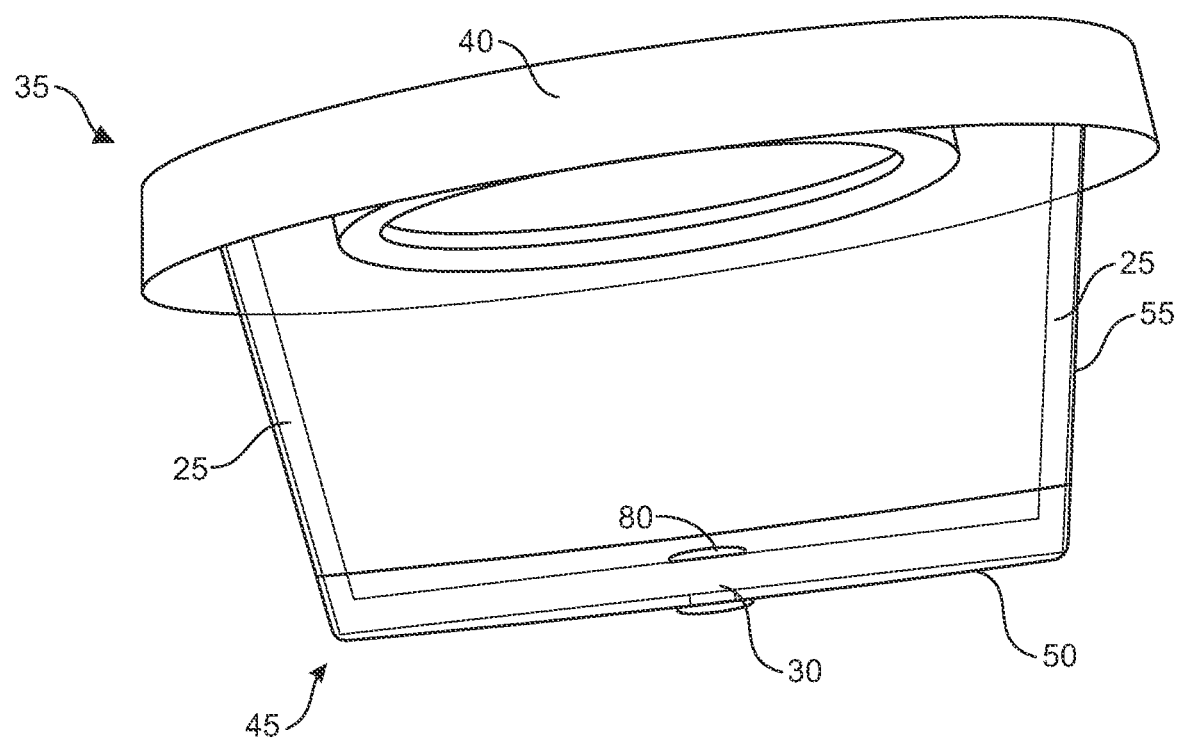
FIG. 9 is a side perspective view of a kit showing the release mechanism fastened to the bottom of an open container.
Figure 10:
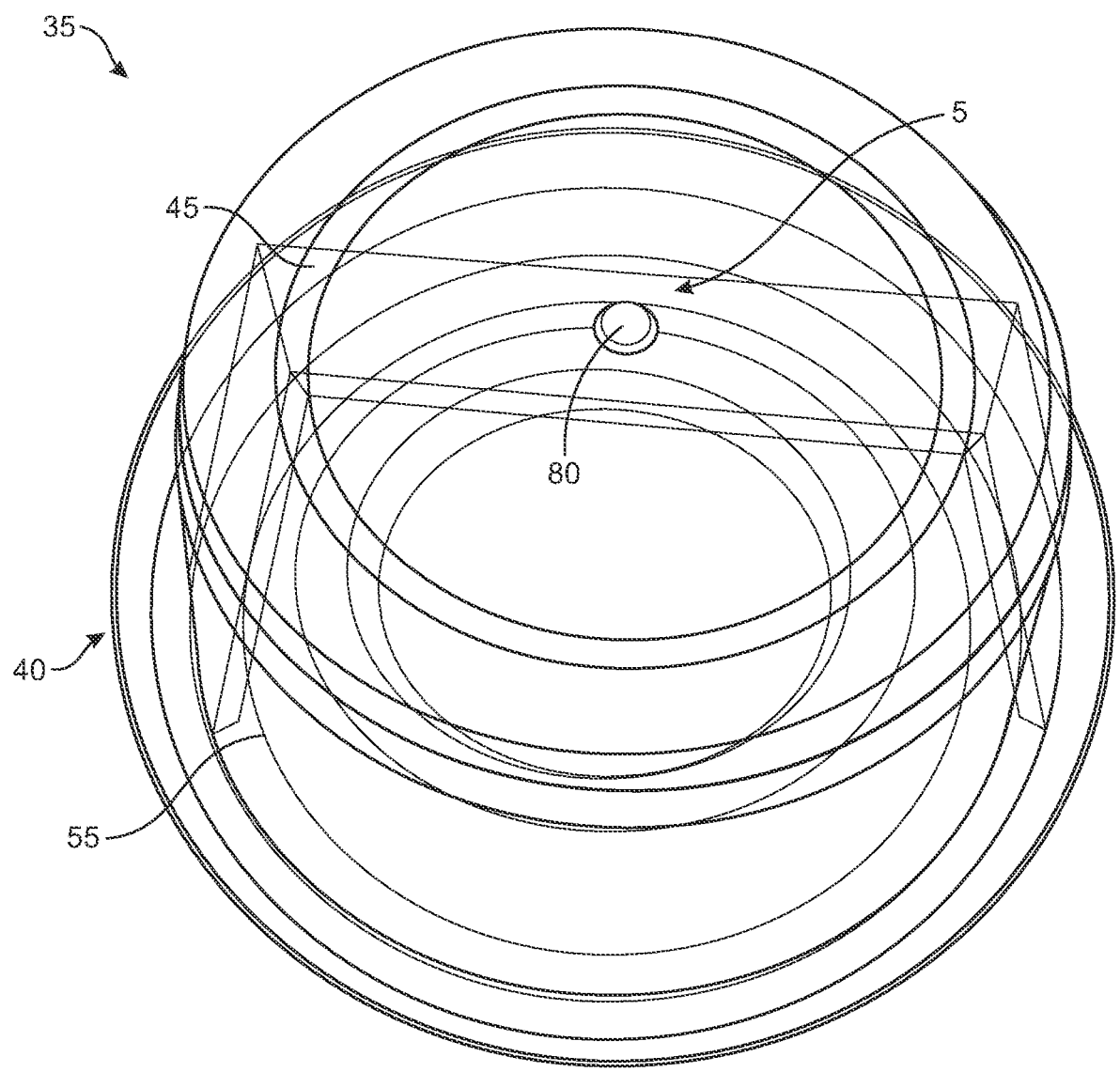
FIG. 10 is a bottom perspective view of a kit showing the release mechanism fastened to the bottom of a closed container.

In yet another embodiment, as shown in FIGS. 8-10, the release mechanism 5 may be fastened to the base 50 of the container 35 with a fastener 80, preferably at or near the radial center of the base 50 that is defined by a central axis. The fastener 80 secures the release mechanism 5 to the bottom of the container 35 to prevent vertical displacement but still allows the release mechanism 5 to rotate freely about the central axis of the container 35 in a sweeping fashion.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A release mechanism for dislodging food from a container comprising:
    a bottom member, and two opposing side members extending therefrom, said bottom member and said opposing side members having an interior surface, an exterior surface, a first end, and a second end, said side members comprising distal ends,
    a fastener operable to secure said bottom member to a base of said container, wherein the location of said fastener defines a vertical central axis,
        wherein said bottom member and said opposing side members are configured to conform to the contours of said container such that said release mechanism is nested within said container,
        wherein said distal ends of said side members are configured to allow a user to rotate said release mechanism in a sweeping fashion about the vertical central axis;
        wherein said fastener is configured to allow rotation of said release mechanism about the vertical central axis and prevent vertical displacement of said bottom member from said base of said container.

2. The release mechanism of claim 1 wherein said first end of any of said opposing sides members comprises a lip protruding inward towards said vertical central axis.

3. The release mechanism of claim 1 wherein said second end of any of said opposing sides members comprises a lip protruding inward towards said vertical central axis.

4. The release mechanism of claim 1 wherein said first end of said bottom member comprises a lip protruding upward in a direction away from said base of said container.

5. The release mechanism of claim 1 wherein said second end of said bottom member comprises a lip protruding upward in a direction away from said base of said container.

6. A release mechanism for dislodging food from a container comprising:
    a bottom member, and two opposing side members extending therefrom, said bottom member and said opposing side members having an interior surface, an exterior surface, a first end, and a second end, said side members comprising distal ends,
        wherein said bottom member and said opposing side members are configured to conform to the contours of said container such that said release mechanism is nested within said container, wherein a center of said container is defined by a vertical central axis,
        wherein said distal ends of said side members are configured to allow a user to rotate said release mechanism in a sweeping fashion about said vertical central axis, and
        wherein said first end or said second end of any of said opposing sides members comprises a lip protruding inward towards said vertical central axis.

7. The release mechanism of claim 6 wherein said first end or said second end of said bottom member comprises a lip protruding upward in a direction away from a base of said container.

8. The release mechanism of claim 6 comprising a fastener operable to secure said bottom member to a base of said container, wherein said fastener is configured to allow rotation of said release mechanism about said vertical central axis and prevent vertical displacement of said bottom member from said base of said container.

9. A release mechanism for dislodging food from a container comprising:
    a bottom member, and two opposing side members extending therefrom, said bottom member and said opposing side members having an interior surface, an exterior surface, a first end, and a second end, said side members comprising distal ends,
        wherein said bottom member and said opposing side members are configured to conform to the contours of said container such that said release mechanism is nested within said container, wherein a center of said container is defined by a vertical central axis,
        wherein said distal ends of said side members are configured to allow a user to rotate said release mechanism in a sweeping fashion about said vertical central axis, and
        wherein said first end or said second end of said bottom member comprises a lip protruding upward in a direction away from a base of said container.

10. The release mechanism of claim 9 wherein said first end or said second end of any of said opposing sides members comprises a lip protruding inward towards said vertical central axis.

11. The release mechanism of claim 9 comprising a fastener operable to secure said bottom member to said base of said container, wherein said fastener is configured to allow rotation of said release mechanism about said vertical central axis and prevent vertical displacement of said bottom member from said base of the container.

\* \* \* \* \*